United States Patent Office 3,583,904
Patented June 8, 1971

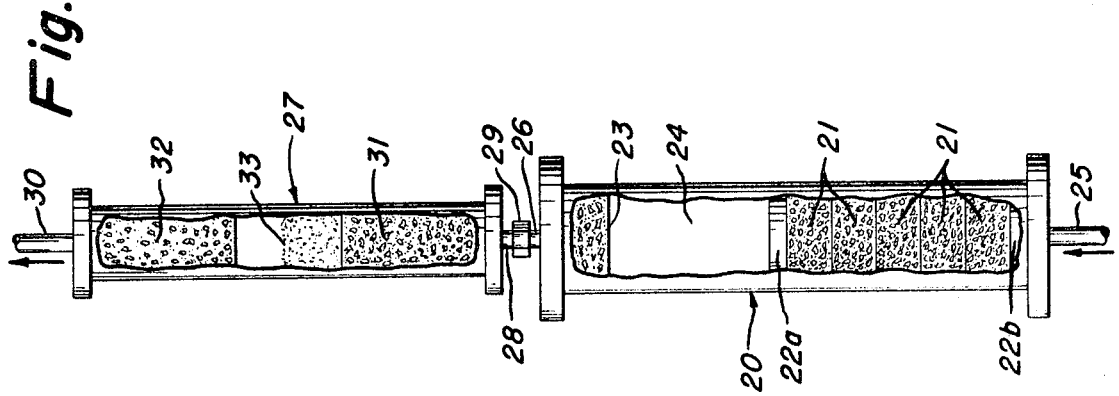
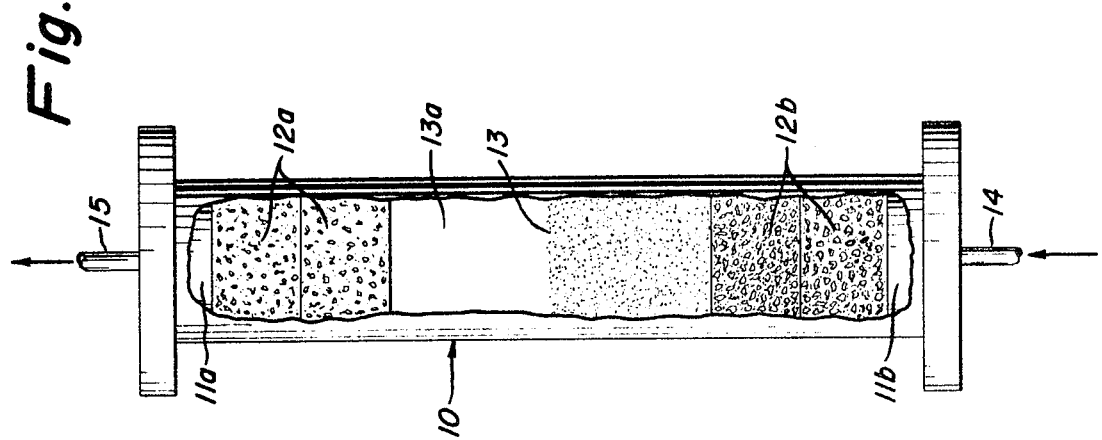

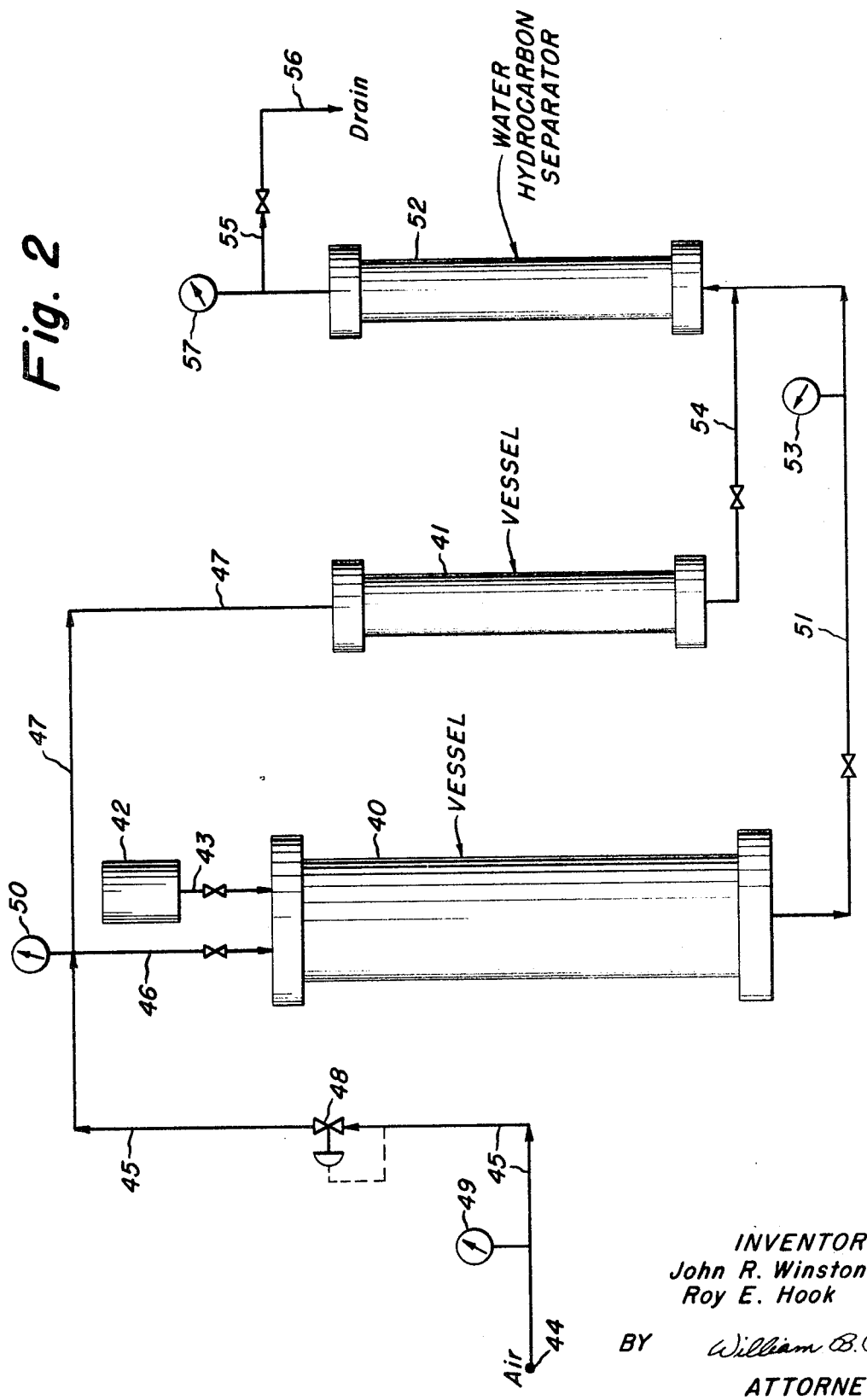

3,583,904
METHOD AND APPARATUS FOR SEPARATING WATER FROM HYDROCARBONS
John R. Winston and Roy E. Hook, Griffith, Ind., assignors to Standard Oil Company (Indiana), Chicago, Ill.
Filed Jan. 22, 1969, Ser. No. 793,104
Int. Cl. C10g 33/04
U.S. Cl. 208—188
9 Claims

ABSTRACT OF THE DISCLOSURE

Apparatus and method for separating water from flowing hydrocarbon streams which contain water either as free water or as a water emulsion. The invention further provides a fail-safe method of operation in that hydrocarbon flow is terminated if the hydrocarbon stream contains water after passing through the separating apparatus because the capacity for water removal has been exceeded. Such beneficial results occur through the use of a material or combination of materials normally permitting liquid hydrocarbon flow but which, in the presence of water, forms a barrier to inhibit liquid flow.

BACKGROUND OF THE INVENTION

In many process applications, especially those found in the petroleum, chemical and allied industries, it is necessary to ensure that certain hydrocarbon streams are not contaminated by emulsified and/or free water. A typical example might be a hydrocarbon slip stream sent to process instruments for analysis. Water in the stream may interfere with the hydrocarbon analysis and, if present in sufficient quantity, can damage the analyzing instruments. As a result, process designs generally incorporate a hydrocarbon sample conditioning system upstream of the analyzing instruments to remove undesirable contaminants, including water. Highly effective water-separating means have been developed for use in conditioning hydrocarbon streams, but most suffer from the limitation that only a limited quantity of water can be separated before regeneration or replacement of the separation means is needed. Since relatively large water transients frequently occur in some hydrocarbon streams, merely estimating separator service based on hydrocarbon flow rate and "on stream" times is often unsatisfactory. Apparatus of the type using a water-sensing means operatively connected to a shut-off valve can be used to ensure that the treated hydrocarbon stream is free from water, but such devices are expensive and often unreliable.

There is a need for an inexpensive and reliable means to separate water from hydrocarbons and to provide a positive interruption of hydrocarbon flow when the water-separating capacity is exceeded. It is an object of this invention to provide an apparatus and method for coalescing and separating emulsified water from hydrocarbon streams. Another object of this invention is to provide a means for separating free water from hydrocarbon streams. In another aspect, an object of this invention is to provide a means for storing water which has been coalesced and separated from a flowing hydrocarbon stream. An additional object is to provide a method and an apparatus for terminating the flow of a hydrocarbon stream when the water storage capacity of the separator apparatus through which the stream has been flowing is reached. In this respect, in one of its embodiments it is a further object of this invention to produce a signal (such as a pressure signal) when the water storage capacity of the separator apparatus is reached, whereby the hydrocarbon stream is directed to a standby separator and a procedure is initiated to service the original separator. Alternatively, a signal can be activated to summon an operator to manually perform the necessary steps in switching and servicing the equipment.

Although this invention is described in terms of its use in process instrument systems, it is evident that, in its broader aspects, it can be adapted for use as a safety device whenever it is either necessary or desirable to positively exclude water from hydrocarbon streams.

SUMMARY OF THE INVENTION

This invention relates to an improved apparatus and method for separating water from flowing hydrocarbon streams. The improvement resides in the fact that when the resultant "water-free" hydrocarbon stream is found to, in fact, contain some water, hydrocarbon flow is automatically terminated. As a first step, the method of this invention involves contacting the hydrocarbon-water stream with an adsorber-coalescer material which, as is well known, results in separating the water from the hydrocarbon. An example of an adsorber-coalescer material which may be used for this purpose includes open cell foams of plastic materials such as polyurethane. The hydrocarbon-water stream is then contacted with a material which has the specific property of coagulating in the presence of water. As used herein, the term "coagulate" means the transformation from a solid, granular or free-flowing powder to a relatively viscous liquid or non-particulate solid. The term "relatively viscous" broadly includes viscosities in excess of 100 centipoises and, preferably, viscosities in excess of about 250 centipoises. Materials having this coagulating property include certain types of sodium carboxymethyl cellulose, hereafter sometimes referred to as "CMC." Broadly speaking, this process works on the principle that when the water-holding capacity of the separator material has been exhausted, any additional water-containing hydrocarbon passing therethrough will retain the water and will contact the coagulatable material to rapidly produce a viscous liquid aqueous solution or non-particulate solid mass. This viscous liquid or solid mass creates a barrier preventing the flow of hydrocarbon.

The concept of this invention is further embodied in an apparatus comprising an adsorber-coalescer zone and a coagulator zone. These zones may be located in the same or in separate physical containers. It is critical, however, that the adsorber-coalescer zone and the coagulator zone by positioned sequentially so that the hydrocarbon-water mixture passes first through the adsorber-coalescer zone and then into the coagulator zone with sufficient volume between such zones to provide for water accumulation. Furthermore, both zones must be designed so that the entire liquid stream passes into the adsorber-coalescer zone and then into the coagulator zone.

BRIEF DESCRIPTION OF THE DRAWINGS

FIG. 1a is an elevational view with a portion broken away of one embodiment of the apparatus of the invention wherein the adsorber-coalescer zone and coagulator zone are disposed within a single vessel.

FIG. 1b is an elevational view with portions broken away of an alternative embodiment of the invention wherein the adsorber-coalescer zone is disposed within the lower vessel and the coagulator zone is disposed within the upper vessel.

FIG. 2 is a schematic diagram of equipment used to test the operation of this invention.

DETAILED DESCRIPTION AND SPECIFIC EMBODIMENTS

This invention makes use of the specific properties of materials in a novel manner to provide a highly effective water-hydrocarbon separator. Since operability depends on these properties, great care must be exercised in selecting the adsorber-coalescing material and the coagulator material. It has been found that polyester base flexible urethane foam makes an excellent adsorber-coalescer material. The foam selected for use in the embodiments described below is an open pore material having a large surface area and a three-dimensional cell structure conducive to in-depth coalescing. Polyurethane as is described in U.S. Pat. 3,171,820, having a 97% open structure, controlled pore size, and a fibrous-like three-dimensional structure, is preferred. Any material used for the purpose of adsorbing and coalescing water should have a very high ratio of open:closed cells with minimum restriction of flow and be resistant to hydrocarbon attack. A small amount of swelling (10 to 20%) in hydrocarbons is desirable.

Selection of the coagulating material is difficult in that few substances have the desired properties of being substantially unaffected by hydrocarbons but also being hydroscopic to form highly viscous aqueous solutions. The material selected in the preferred embodiment is comprised chiefly of sodium carboxymethyl cellulose (CMC), which is available in powdered or granular form. A number of grades of CMC are available and it is important that the proper form be used. The CMC used with this invention should have a viscosity in excess of 100 cps., preferably in the range of between about 250 to 500 cps., in a 2% aqueous solution at 25° C. Because of purification problems, very pure CMC is difficult to obtain and need not be used. In embodiments below, the coagulating material consisted of a composition comprising about 65 to 67% CMC, 20 to 23% NaCl and 4.5 to 8.5% sodium glycolate.

CMC is prepared by treating alkali cellulose with sodium chloroacetate according to the reaction:

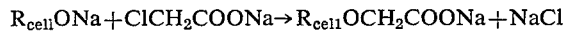

$$R_{cell}ONa + ClCH_2COONa \rightarrow R_{cell}OCH_2COONa + NaCl$$

At a temperature of 25° C., the cellulose is alkalized using a 30% solution of sodium hydroxide. The alkali cellulose is shredded in a sigma-blade shredder and sodium chloracetate is added while shredding is continued at a temperature of 25° C. until the reaction is essentially complete. Excess alkali is neutralized and the product is then precipitated by the addition of methanol or ethyl alcohol. Impurities include sodium chloride and sodium glycolate.

This invention may be more clearly understood by referring to FIGS. 1a and 1b, which are alternative embodiments. In FIG. 1a, the adsorber-coalescer and coagulator zones are both contained within vessel 10. Spacers 11 and 11b are located in vessel 10, spacer 11a being at the top of vessel 10 and spacer 11b being located at the bottom of vessel 10. A first set of polyurethane foam discs 12a are located within vessel 10 and are positioned at the top of vessel 10 with one of the discs being in contact with spacer 11a. A second set of polyurethane foam discs 12b are located in vessel 10 and are positioned such that one of said discs is in contact with spacer 11b. Polyurethane discs 12a and 12b are designed to fit tightly against the walls of vessel 10 to ensure that none of the hydrocarbon passing through vessel 10 bypasses the polyurethane. Vessel 10 is an 8-inch metal tube, having a 1-inch inner diameter. The diameter of the polyurethane discs 12a and 12b is about ¼-inch larger than the inner diameter of vessel 10 to ensure a tight fit, and the height of each polyurethane disc 12a and 12b is about 1 inch. Located in the space between polyurethane discs 12a and 12b is about 25 cc. of technical grade CMC powder 13. Hydrocarbon enters vessel 10 via inlet 14, flows through the polyurethane discs 12a, CMC powder 13, polyurethane discs 12b and exits via outlet 15. Water contained in the hydrocarbon is coalesced and adsorbed in the lower polyurethane discs 12a. As hydrocarbon flows through the system, the CMC powder 13 is carried upward and held loosely against the bottom surface of foam 12A so that it occupies a part of volume 13a. The coalescing action of foam 12B causes separation of water from the hydrocarbon. When the small water-storage capacity of foam 12B is exceeded, the separated water moves into the volume between the top surface of foam 12B and the bottom surface of CMC 13. A distinct and continuous water layer exists through which hydrocarbon flows without reemulsification of water in the hydrocarbon. When the top surface of the water layer (water/hydrocarbon interface) contacts the bottom of CMC 13, a highly viscous gel is formed across the entire cross-section of tube 10. Wetting of CMC 13 to a depth of ⅛–¼-inch produces a gel layer capable of blocking flow through the tube at the pressure employed.

Another embodiment of the invention is shown in FIG. 1b. In this embodiment the adsorbing-coalescing zone is contained in one vessel, and the coagulating zone is contained in a separate vessel. The coalescing section comprises a 12-inch stainless steel containment vessel 20, having an internal diameter of 2⅛ inches. Within the containment vessel 20, and near the bottom thereof, are five polyurethane foam discs 21, each having a diameter of 2½ inches and a length of 1 inch. A top retainer plate 22a and a bottom retainer plate 22b are used to keep polyurethane foam discs 21 positioned at the bottom of containment vessel 20. A similar polyurethane disc 23 is positioned at the top of vessel 20. A water storage volume 24 is thus provided in vessel 20 above retainer plate 22a and below polyurethane disc 23. An inlet 25 is at the bottom of containment vessel 20 and an outlet 26 is at the top of containment vessel 20.

The coagulating zone is located in containment vessel 27. Containment vessel 27 has an inlet 28 which is connected to outlet 26 of containment vessel 20 by means of union 29. An outlet 30 is provided at the top of containment vessel 27 for withdrawing the hydrocarbon. Containment vessel 27 comprises a stainless steel tubular vessel 8 inches in length, having an internal diameter of 1⅛ inches. A polyurethane foam cylinder 31, 3 inches long and 1¼ inches in diameter is disposed near the bottom of containment vessel 27. A similar polyurethane foam cylinder 32 is disposed near the top of containment vessel 27. Fifteen cubic centimeters of CMC powder 33 is disposed within containment vessel 27 in the space provided between polyurethane foam cylinders 31 and 32.

Hydrocarbon fluid enters containment vessel 20 through inlet 25, passes through the adsorber-coalescer zone and exits via outlet 26. The fluid then enters containment vessel 27 via inlet 28, passes through the coagulator zone and exits via outlet 30. Free water and entrained water are coalesced and adsorbed in polyurethane discs 21, with the bulk of the water being retained in volume 24. The hydrocarbon stream flowing into containment vessel 27 is substantially free from any entrained water. Once the water-adsorbing capacity of polyurethane discs 21 and 23 is reached and volume 24 is filled with water, any excess water will flow with the hydrocarbon into containment vessel 27. An additional water-coalescing and storage function is provided by polyurethane cylinder 31, but when this water contacts the CMC powder 33 the viscous gel is formed which prevents the flow of liquid in the manner described above. The advantage of separating the adsorber-coalescer zone and the coagulator zone is to allow for convenient replacement of the polyurethane material. Preferably, automatic flow cutoff will not often occur so that only the lower section of the apparatus will require servicing at regular intervals. Of course, once water reaches the CMC to form the viscous gel, it is necessary to replace or to service both sections of the apparatus.

A test rig, as shown in FIG. 2, was designed to check the operation of the water-hydrocarbon separator. This rig includes a hydrocarbon vessel 40 and a water cylinder 41. Hydrocarbon is charged to vessel 40 from reservoir 42 via valved line 43. Air, from source 44, is supplied to vessels 40 and 41 via lines 45, 46 and 47. A pressure regulator 48 is located in line 45 to control the pressure in vessels 40 and 41. Pressure gage 49 is used to measure the air pressure upstream of pressure regulator 48 and pressure gage 50 is used to measure the air pressure downstream of pressure regulator 48. Valved line 51 extends from the bottom of vessel 40 to the inlet of water-hydrogen separator 52 which is identical to the apparatus shown in detail in FIG. 1a. Pressure gage 53 in valved line 51 measures the hydrocarbon pressure upstream of water-hydrocarbon separator 52. Valved line 54 extends from the bottom of vessel 41, joining with valved line 51 upstream of water-hydrocarbon separator 52. Valved line 55 extends from the outlet of water-hydrocarbon separator 52 and terminates in drain 56. A pressure gage 57 is present in valved line 55 for use in determining the pressure drop across water-hydrocarbon separator 52.

About 2 gallons of naphtha containing some emulsified and free water are charged to vessel 40 via reservoir 42 and valved line 43. The valve in line 43 is closed to prevent liquid backflow. Vessel 41 is charged with about 100 cc. of water. With all valves closed, the system is then connected to 100 p.s.i. air source 44. Pressure regulator 48 is adjusted to provide a pressure reading on pressure gage 50 of 15 p.s.i. The valves in line 46 and line 51 are opened to permit the flow of naphtha to water-hydrocarbon separator 52. The pressure drop across water-hydrocarbon separator 52 is about ½ p.s.i., as determined from readings taken from pressure gage 53 and pressure gage 57. The valve in line 55 is cracked to bleed off air from the system and to adjust the flow of naphtha to a rate of about 100 cc. per minute. After a few minutes, the valve in line 54 is momentarily opened to permit the flow of a 5 cc. increment of water from vessel 41 to water-hydrocarbon separator 52. This is repeated and each time a 5 cc. increment of water is introduced into water-hydrocarbon separator 52, the pressure drop across water-hydrocarbon separator 52 is noted.

The purpose of such tests is to simulate the flow of hydrocarbon containing small amounts of free and emulsified water as well as to simulate the effect of introducing random slugs of free water into the water-hydrocarbon separator. It was determined that although some of the coalesced water was retained by the polyurethane foam, the majority was held in the space between the foam and the CMC (the hydrocarbon flow causing the CMC to rest against the top foam). As expected, the pressure drop across the separator varied with the viscosity of the hydrocarbon tested. At an inlet pressure of about 15 p.s.i. and a hydrocarbon flow rate of 80 to 90 cc. per minute, the pressure drop across water-hydrocarbon separator was between about 1 to 1½ p.s.i. for naphtha, 4 p.s.i. for furnace oil and between about ½ to 1 p.s.i. for gasoline. Under such conditions, the top foam section compressed about 30 to 50%, depending on the pressure drop across the water-hydrocarbon separator. After the addition of approximately 40 cc. of water, the water-hydrocarbon interface was raised sufficiently so that water contacted the bottom surface of CMC. After the CMC was observed to become wetted to a depth of about ⅛-inch, liquid flow terminated. Within 30 sec. after water contact, the gel barrier was formed sufficiently to cause hydrocarbon flow to terminate. At no time was either water or CMC observed in the effluent hydrocarbon stream.

Although this invention has been described with some degree of particularity, other modifications and variations thereof will become obvious to those familiar with the art. This is particularly true in respect to the specific choice of materials for the coagulant and the adsorber-coalescer. In addition, the apparatus may be used in various automatic or control modes by taking advantage of the variation in pressure drop across the unit. As stated previously, this pressure drop can be used to operate switches which can, for example, bypass the hydrocarbon stream to a standby water-hydrocarbon separator. It could also alert operators as to upset operating conditions in the process units. There are some indications that the CMC provides the added salutary effect dehydrating the hydrocarbon by partially removing dissolved water. This, however, has not been confirmed. Many other variations and modifications of this invention are possible and it is not intended that the scope be limited either by the materials recited in the specification or by the specific embodiments. The invention should only be limited by the general disclosure and by the following claims:

What is claimed is:

1. A method for treating a liquid hydrocarbon stream containing a quantity of water, said method insuring that after treatment said hydrocarbon is substantially free from water, comprising:
   (a) contacting said liquid hydrocarbon stream with a first material comprising a polyester base, flexible urethane foam having a high ratio of open-to-closed cells said first material being capable of coalescing and adsorbing water from said hydrocarbon and being substantially non-reactive with said hydrocarbon; and
   (b) passing said hydrocarbon stream through a second material comprising sodium carboxymethyl cellulose, said second material permitting the passage of water-free liquid hydrocarbon but preventing flow of such liquid hydrocarbon in the presence of water.

2. A water-hydrocarbon separator for treating a liquid hydrocarbon stream which contains at least some water, comprising:
   (a) a containment vessel, including an inlet to receive such liquid hydrocarbon stream and an outlet for discharging such liquid hydrocarbon stream;
   (b) an adsorber-coalescer zone disposed within said containment vessel and communicating with said inlet, said adsorber-coalescer zone including a material comprising a polyester base, flexible urethane foam having a high ratio of open-to-closed cells, which material being substantially non-reactive with said hydrocarbon and which has the property of separating the hydrocarbon liquid and water into separate liquid phases and adsorbing at least a part of said water; and
   (c) a coagulator zone disposed within said containment vessel and located downstream from said adsorber-coalescer zone, said coagulator zone including a coagulant material comprising sodium carboxymethyl cellulose, said coagulant material having sufficient porosity to permit flow of said liquid hydrocarbon stream therethrough and being capable of coagulating in the presence of water so as to be impervious to the flow of liquid hydrocarbon.

said adsorber-coalescer zone and said coagulator zone being disposed within said containment vessel so that essentially all liquid hydrocarbon received by said inlet and discharged through said outlet passes sequentially through said adsorber-coalescer zone and coagulator zone, said containment vessel further providing a storage volume between said zones and retaining the separated liquid water phase.

3. The apparatus of claim 2 wherein said sodium carboxymethyl cellulose has a viscosity in excess of about 100 cps. when in 2% aqueous solution at 25° C.

4. A water-hydrocarbon separator for treating a liquid hydrocarbon stream containing at least some water; comprising:
   (a) a first containment vessel including an adsorber-coalescer zone comprising a polyester base, flexible urethane foam having a high ratio of open-to-closed cells which tends to separate said hydrocarbon and said water into separate liquid phases, said containment vessel having a storage volume above said adsorber-coalescer zone for retaining the liquid water phase; and
   (b) a second containment vessel having an inlet which is in fluid communication with the outlet of said first containment vessel, and an outlet for discharging said liquid hydrocarbon stream, said second containment vessel including a coagulator zone comprising a coagulant material comprising sodium carboxymethyl cellulose having sufficient porosity to permit the flow of liquid hydrocarbon therethrough, said coagulant material being capable of coagulating in the presence of water so as to be impervious to the flow of liquid hydrocarbon, said adsorber-coalescer zone being disposed within said first containment vessel so that all hydrocarbon flowing through said first containment vessel passes through said adsorber-coalescer zone and said coagulator zone deposited within said second containment vessel so that essentially all liquid hydrocarbon from said first containment vessel passes through said coagulant zone.

5. The apparatus of claim 4 wherein said sodium carboxymethyl cellulose has a viscosity of between about 250 and 500 cps. when measured at 25° C. in aqueous solution containing 2% water.

6. A method for treating a liquid hydrocarbon stream containing a quantity of water, said method insuring that after treatment said hydrocarbon is substantially free from water, comprising:
    (a) contacting said liquid hydrocarbon stream with a first material comprising a polyester base, flexible urethane foam having a high ratio of open-to-closed cells said first material being capable of coalescing and adsorbing water from said hydrocarbon and being substantially non-reactive with said hydrocarbon; and
    (b) passing said hydrocarbon stream through a granular material which is normally permeable to liquid hydrocarbons but which coagulates in the presence of water to form a highly viscous aqueous solution having a viscosity in excess of 100 cps. when measured in 2% aqueous solution at a temperature of 25° C.

7. The method of claim 1 wherein said urethane foam has an open structure of about 97% and wherein said sodium carboxymethyl cellulose has a viscosity in excess of 100 cps. in 2% aqueous solution at 25° C.

8. The method of claim 7 wherein said viscosity of 2% aqueous solution of sodium carboxymethyl cellulose at 25° C. is in the range of between about 250 and 500 cps.

9. The apparatus of claim 3 wherein said urethane foam has an open structure of about 97% and wherein said sodium carboxymethyl cellulose is of the type having a viscosity in the range of between about 250 and 500 cps. when in a 2% aqueous solution and measured at 25° C.

References Cited
UNITED STATES PATENTS

| | | | |
|---|---|---|---|
| 1,947,709 | 2/1934 | Garrison et al. | 252—329 |
| 2,357,767 | 9/1944 | Robbins | 208—188 |
| 3,215,619 | 11/1965 | Brooke | 208—187 |
| 3,268,442 | 8/1966 | Pall et al. | 208—188 |
| 3,380,914 | 4/1968 | Vranian | 208—188 |
| 3,417,013 | 12/1968 | Roberts | 208—188 |

DELBERT E. GANTZ, Primary Examiner

G. J. CRASANAKIS, Assistant Examiner

U.S. Cl. X.R.

23—293; 252—331